Dec. 13, 1966   W. T. MONAGHAN   3,290,886
GAS TURBINE ENGINE WITH PIVOTALLY
INTERCONNECTED DEFLECTOR MEMBERS
Filed Oct. 26, 1964   2 Sheets-Sheet 1

Inventor
WILLIAM THOMAS MONAGHAN
By Cushman Darby & Cushman
Attorneys

United States Patent Office

3,290,886
Patented Dec. 13, 1966

3,290,886
GAS TURBINE ENGINE WITH PIVOTALLY INTERCONNECTED DEFLECTOR MEMBERS
William Thomas Monaghan, Bulwell, England, assignor to Rolls-Royce Limited, Derby, England, a company of Great Britain
Filed Oct. 26, 1964, Ser. No. 406,263
Claims priority, application Great Britain, Oct. 28, 1963, 42,503/63
4 Claims. (Cl. 60—226)

This invention concerns a gas turbine engine.

According to the present invention, there is provided a gas turbine engine having an annular gas duct within which there are arranged in flow series compressor means, combustion equipment, and turbine means, an air duct which annularly surrounds the said gas duct, the air duct being arranged to discharge its air to atmosphere in the form of an annulus surrounding the turbine exhaust gases, a plurality of pivotally mounted exhaust gas deflector members each of which is connected by a linkage to one of a plurality of ducted air deflector members which are pivotally mounted at the downstream end of the gas duct, and power means which are directly connected to the ducted air thrust deflector members, the power means being operable to move the ducted air deflector members and hence, via the said linkages, to move the exhaust gas thrust deflector members.

Preferably, the ducted air deflector members and the exhaust gas deflector members are, in each case, constituted by two eyelid members.

The air duct could be arranged to receive ram air or bypass air. Preferably, however, the air duct has a fan mounted therein.

The fan is preferably driven by the said turbine means. Thus the said turbine means may comprise a high pressure turbine and a low pressure turbine, the fan being driven by the high pressure turbine.

Figure 1:
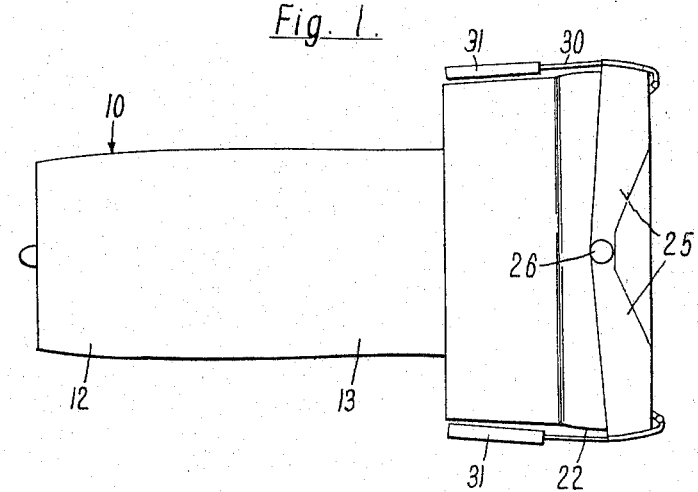
Figure 3:
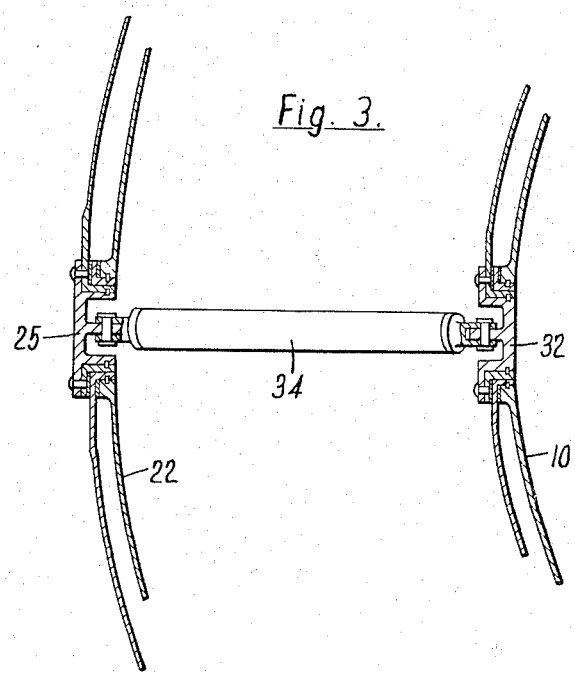
Figure 2:
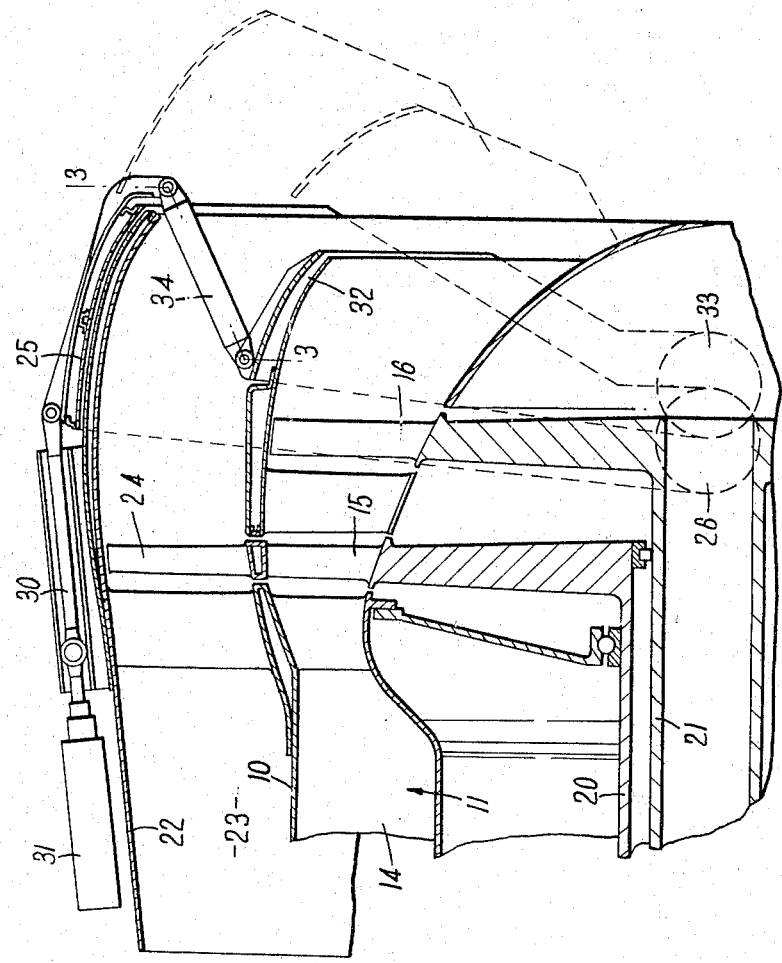

The invention is illustrated, merely by way of example in the accompanying drawings, in which:

FIGURE 1 is an elevation of a gas turbine engine according to the present invention, FIGURE 2 is a broken-away section of the downstream end of the gas turbine engine of FIGURE 1, and FIGURE 3 is a broken-away sectional view taken on the line 3—3 of FIG. 2.

Referring to the drawings, a vertical take-off aircraft (not shown) is provided with a horizontally mounted gas turbine forward propulsion engine having a casing 10 within which is formed an annular gas duct 11.

Within the gas duct 11 there are mounted in flow series a low pressure compressor 12, a high pressure compressor 13, combustion equipment 14, a high pressure turbine 15, and a low pressure turbine 16.

The high pressure turbine 15 and the high pressure compressor 13 are both mounted on a shaft 20 within which is concentrically mounted a shaft 21, the low pressure compressor 12 and low pressure turbine 16 both being mounted on the shaft 21.

At the downstream end of the engine there is mounted an outer casing 22 within which there is formed an air duct 23 which annularly surrounds the gas duct 11. The air duct 23 is arranged to discharge its air to atmosphere in the form of an annulus which surrounds the turbine exhaust gases.

Mounted in the air duct 23 are fan rotor blades 24 which are integral with and driven by the rotor blades of the high pressure turbine 15.

A pair of eyelid members 24 are mounted on common pivots 26 at the downstream end of the casing 22, the eyelid members 25 extending closely about the outer casing 22.

Each of the eyelid members 25 is connected by a link 30 to a pneumatically or hydraulically operated ram 31. The rams 31 may be employed to move the eyelid members 25 between a retracted position, in which they have no effect on the direction of thrust of the fan air leaving the air duct 23, and an extended position (shown in dotted lines in FIG. 2) in which the fan air leaving the air duct 23 is deflected downwardly.

A pair of eyelid members 32 are mounted on common pivots 33 at the downstream end of the casing 10, the eyelid members 32 extending closely about the casing 10. Each of the eyelid members 32 is pivotally connected to one end of a link 34 whose other end is pivotally connected to an eyelid member 25.

The eyelid members 32 are movable between a retracted position, in which they have no effect on the direction of thrust of the turbine exhaust gases leaving the gas duct 11, and an extended position (shown in dotted lines in FIG. 2) in which the turbine exhaust gases leaving the gas duct 11 are deflected downwardly.

It will thus be appreciated that, when the rams 31 are brought into operation they move the eyelid members 25 and hence move the eyelid members 32 via the links 34, the eyelid members 25, 32 being thus arranged simultaneously to deflect the thrust of the fan air and the thrust of the turbine exhaust gases in the same direction.

The rams 31 are brought into operation when the said aircraft is undergoing its transitional stage between vertical ascent and forward flight, or between forward flight and vertical descent.

It will be appreciated that the present invention is applicable to arrangements wherein the gas duct 11 and the air duct 23 are respectively provided with single eyelid deflector members, rather than the pairs of eyelid deflector members (32, 25 respectively) shown in the illustrated embodiment. One such arrangement could be said to be illustrated by FIGURE 2 if it be assumed that the eyelid members 25, 32 are the sole deflector members, and are not parts of respective pairs of eyelid members.

I claim:

1. A gas turbine engine having inner and outer engine casings defining an annular gas duct; compressor means, combustion equipment, and turbine means arranged in flow series within said gas duct; an outer casing annularly surrounding the downstream end of said outer engine casing and defining therewith an annular air duct, the air duct discharging its air to atmosphere in the form of an annulus surrounding the turbine exhaust gases, an exhaust gas deflector member pivotally mounted at the downstream end of the outer engine casing; a ducted air deflector member pivotally mounted, independently of the gas deflector member, at the downstream end of the outer casing; a link extending between and pivotally connected to both said deflector members; and power means directly connected to the said ducted air deflector member, said power means being operable to move the said ducted air deflector member and hence, via said link, to move the said exhaust gas deflector member.

2. A gas turbine engine having inner and outer engine casings defining an annular gas duct; compressor means, combustion equipment, and turbine means arranged in flow series within said gas duct; an outer casing annularly surrounding the downstream end of said outer engine casing and defining therewith an annular air duct, the air duct discharging its air to atmosphere in the form of an annulus surrounding the turbine exhaust gases; a pair of exhaust gas eyelid deflector members pivotally mounted at the downstream end of the outer engine casing; a pair of ducted air eyelid deflector members pivotally mounted, independently of the gas deflector members, at the downstream end of the outer casing; a pair of links, each of which extends between and is pivotally connected to a said gas deflector member and an adjacent said air deflector member; and power means which are directly connected to the ducted air deflector members, the power means being operable to move said air deflector members and hence via the said links, to move the exhaust gas deflector members.

3. A gas turbine engine as claimed in claim 2 in which a fan is mounted in the said air duct, said fan being drivingly connected to said turbine means of the engine.

4. A gas turbine engine as claimed in claim 2 in which said turbine means comprises a high pressure turbine and a low pressure turbine arranged in flow series within said gas duct, and a fan mounted in the said air duct and drivingly connected to the said high pressure turbine.

References Cited by the Examiner
UNITED STATES PATENTS

| | | | |
|---|---|---|---|
| 2,735,264 | 2/1956 | Jewett | 60—35.55 |
| 2,873,576 | 2/1959 | Lombard | 60—35.6 |
| 3,041,830 | 7/1962 | Thomas et al. | 60—35.6 |
| 3,068,644 | 12/1962 | Worsham et al. | 60—35.6 |

CARLTON R. CROYLE, *Primary Examiner.*